US012108861B1

(12) United States Patent
Lee et al.

(10) Patent No.: US 12,108,861 B1
(45) Date of Patent: Oct. 8, 2024

(54) COSMETIC-DISPENSING SPATULA

(71) Applicant: SAMHWA CO., LTD, Uiwang-si (KR)

(72) Inventors: Kyungchang Lee, Uiwang-si (KR); Jonghyun Park, Suwon-si (KR); Ga Yeon O, Ansan-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 0 days.

(21) Appl. No.: 18/352,523

(22) Filed: Jul. 14, 2023

(30) Foreign Application Priority Data

May 2, 2023 (KR) ........................ 10-2023-0056842

(51) Int. Cl.
*A45D 34/04* (2006.01)
*B05C 11/04* (2006.01)
*B05C 17/005* (2006.01)

(52) U.S. Cl.
CPC ........ *A45D 34/04* (2013.01); *A45D 2200/055* (2013.01); *B05C 11/04* (2013.01); *B05C 17/00569* (2013.01)

(58) Field of Classification Search
CPC ........ A45D 34/00; A45D 34/04; A45D 40/00; A45D 40/26; B05C 11/04; B05C 11/044; B05C 11/045; B05C 11/08; B05C 17/005; B05C 17/00569; B05C 17/00503
USPC ...................................... 401/261–266, 188 R
See application file for complete search history.

(56) References Cited

U.S. PATENT DOCUMENTS

| | | | | |
|---|---|---|---|---|
| 9,427,764 | B2 * | 8/2016 | Duquet | B05C 1/04 |
| 2007/0075097 | A1 * | 4/2007 | Behar | B05B 11/0089 222/256 |
| 2008/0131191 | A1 * | 6/2008 | deVirag | B65D 47/42 401/172 |
| 2008/0314934 | A1 * | 12/2008 | Decottignies | B05B 11/007 222/491 |

* cited by examiner

*Primary Examiner* — David J Walczak
(74) *Attorney, Agent, or Firm* — Bridgeway IP Law Group, PLLC; Jihun Kim

(57) ABSTRACT

A cosmetic-dispensing spatula includes: a case unit having a storage space for holding a liquid content; a pump unit that is coupled to an upper portion of the case unit and is configured to suction the content from the inlet and discharge the content at the outlet; and a spatula unit that is coupled to an upper portion of the pump unit and includes a discharge channel and a spreader surface. The discharge channel communicates with the outlet, and the spreader surface has a dispensing hole formed therein that communicates with the discharge channel. The pump unit is configured to discharge the content when the spatula unit is pressed downward.

8 Claims, 12 Drawing Sheets

COSMETIC-DISPENSING SPATULA

CROSS-REFERENCE TO RELATED APPLICATIONS

This application claims the benefit of Korean Patent Application No. 10-2023-0056842, filed with the Korean Intellectual Property Office on May 2, 2023, the disclosure of which is incorporated herein by reference in its entirety.

BACKGROUND

1. Technical Field

The present invention relates to a tool for applying a cosmetic, more particularly to a cosmetic-dispensing spatula that can be used conveniently and with a low likelihood of the cosmetic contaminating the surroundings.

2. Description of the Related Art

A foundation is a type of cosmetic that is applied on the user's face so as to hide blemishes on the face and even out the color of the face in a tone desired by the user. Cosmetics are provided in various forms and are applied with various methods according to their types. However, a cosmetic such as a foundation that has a particular color is typically applied with a tool such as a puff and a spatula, in order that the cosmetic may not stain the user's hand.

A spatula is a tool for applying a cosmetic such as a foundation on the face and is used when the cosmetic is provided in the form of a cream, gel, liquid, etc. The user may first dip the spatula into a container holding the cosmetic such that the cosmetic gets on the spatula and may then apply the cosmetic on the spatula onto the user's face. However, if too much cosmetic gets on the spatula, it can be difficult to dispose of the surplus cosmetic, since scraping the cosmetic back into the cosmetic container may not only cause a mess on the container itself but may also allow foreign substances to enter the cosmetic container. Also, when the spatula is dipped into the container holding the cosmetic, the cosmetic inevitably gets on both sides of the spatula. Because of this, there is the risk that, during the use of the cosmetic on one side of the spatula, the cosmetic on the other side of the spatula may drop on the user's clothes or other objects and cause contamination.

SUMMARY OF THE INVENTION

An aspect of the present invention, which was conceived to resolve the problem described above, is to provide a cosmetic-dispensing spatula that can be used conveniently and with a low likelihood of the cosmetic contaminating the surroundings.

Other objectives of the present invention will be more clearly understood from the embodiments set forth below.

A cosmetic-dispensing spatula according to one aspect of the invention can include: a case unit, on an inner side of which a storage space is defined that opens upward, and which stores a liquid content in the storage space; a pump unit, which is coupled to an upper portion of the case unit, has an inlet communicating with the storage space formed in a lower portion thereof and an outlet formed in an upper portion thereof, and is configured to suction the content from the inlet and discharge the content at the outlet; and a spatula unit, which is coupled to an upper portion of the pump unit, has a discharge channel extending along an up-down direction formed therein, and has a spreader surface formed on its front surface, where the discharge channel can communicate with the outlet, and the spreader surface can have a dispensing hole formed therein that communicates with the discharge channel. Here, the pump unit can be configured to discharge the content when the spatula unit is pressed downward.

A cosmetic-dispensing spatula according to an embodiment of the invention can include one or more of the following features. For example, the spatula unit can further include a pressing part that protrudes outward from the spreader surface. In this case, the dispensing hole can be formed in one side of the spreader surface with respect to a left-right direction, and the pressing part can be formed with a slope such that one side is formed higher than the opposite side with respect to the left-right direction. The spatula unit can also further include a pressing part that protrudes outward from a surface on the opposite side of the spreader surface.

The spatula unit can include: a spatula blade having the spreader surface formed thereon and the dispensing hole formed therein as well as a coupling slot formed on the inside; and a spatula core having the discharge channel formed therein and configured to be inserted into the coupling slot.

The case unit can include an outer case coupled with the pump unit and an inner case coupled to an inside of the outer case and forming the storage space, and the outer case can have a pump-holding part formed in its upper portion, with the pump-holding part recessed downward and open upward. The pump-holding part can be pressed into an open upper portion of the inner case such that an outer perimeter thereof contacts an inner perimeter of the inner case, and the pump unit can be coupled at an inner side of the pump-holding part.

A multiple number of dispensing holes can be formed in the spatula unit in a particular interval along the up-down direction. Also, a multiple number of dispensing channels can be formed in the spatula unit, where the dispensing channels can connect the multiple dispensing holes to the discharge channel, and at least one of the multiple dispensing channels can have a different diameter.

The spatula unit can include at least one material selected from a group consisting of stainless steel, silicone, plastic, and glass.

An embodiment of the present invention having the features above can provide various advantageous effects including the following. However, an embodiment of the present invention may not necessarily exhibit all of the effects below.

A cosmetic-dispensing spatula according to an embodiment of the invention can improve user convenience by allowing the user to manipulate the cosmetic-dispensing spatula with a simple action using one or more fingers while holding the cosmetic-dispensing spatula in one hand. The cosmetic-dispensing spatula can also improve user convenience by dispensing the content in the form of small droplets provided evenly on the spreader surface.

Moreover, since the content does not easily flow down from the dispensing holes and does not get on parts other than the spreader surface, the likelihood of the content contaminating a nearby object due to user negligence can be greatly lowered.

DETAILED DESCRIPTION OF THE INVENTION

Figure 1:
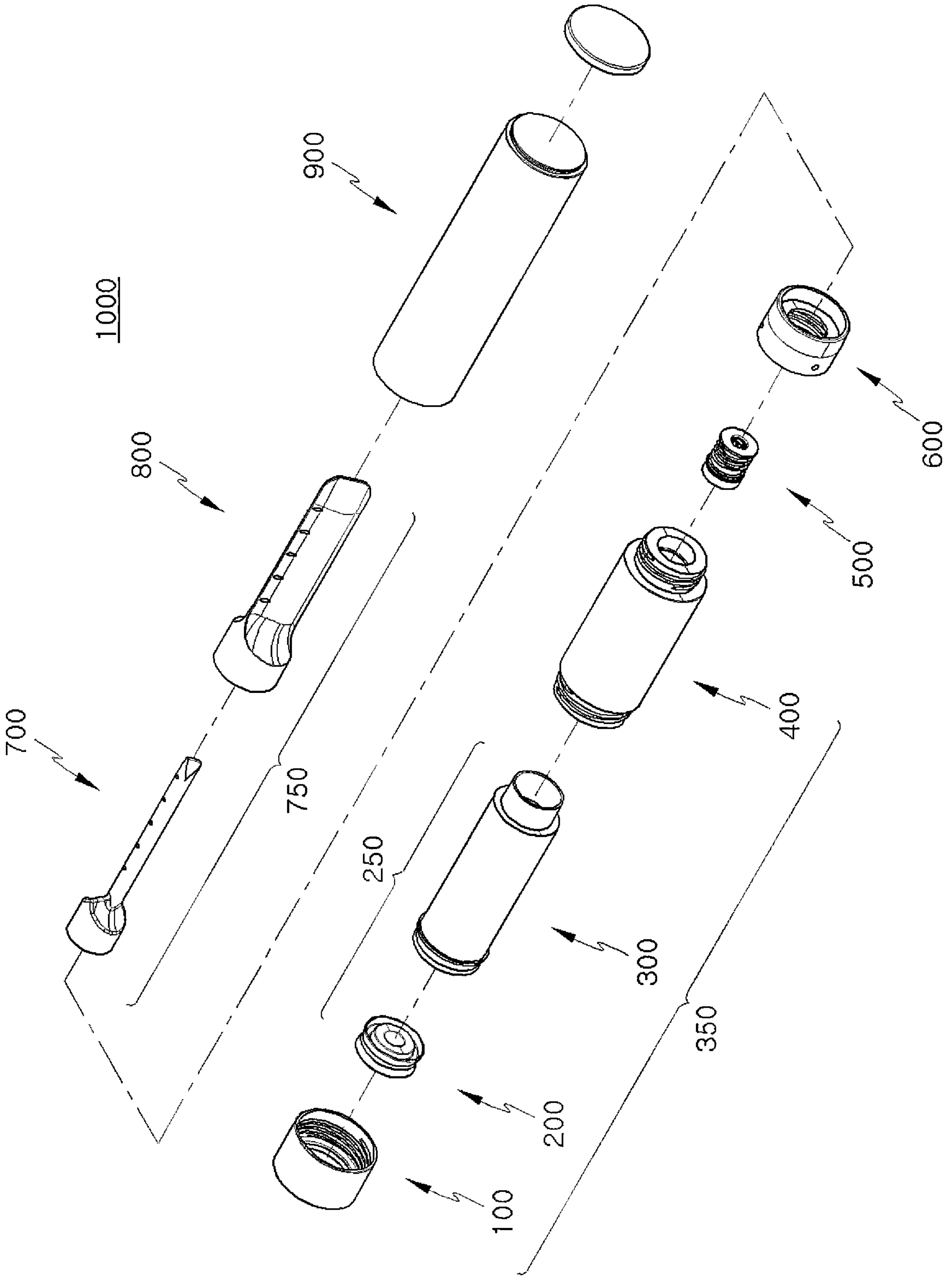
FIG. 1 is an exploded perspective view illustrating a cosmetic-dispensing spatula according to an embodiment of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 3A:
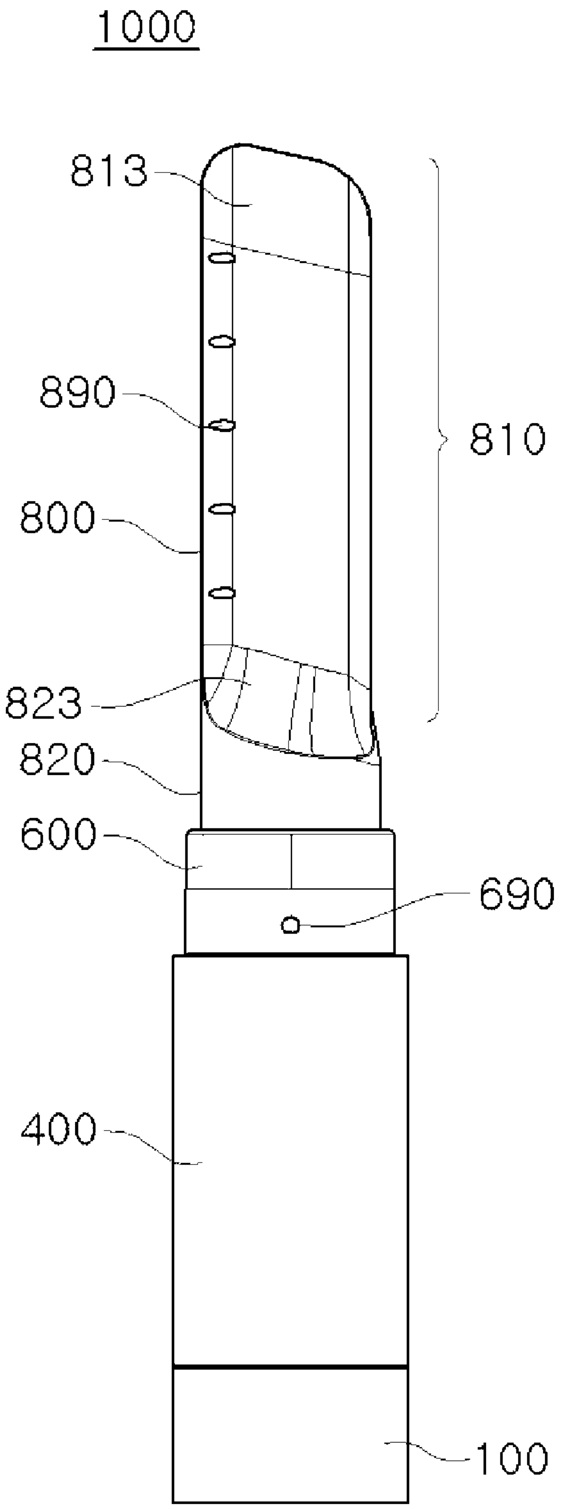
FIG. 3A, FIG. 3B, and FIG. 3C are elevational views illustrating the cosmetic-dispensing spatula shown in FIG. 1 from different angles.

For the sake of convenience, the specification uses terms such as "front," "rear," "left," "right," "upper," "lower," "inner," and "outer." In the descriptions that follow, an "inner" side refers to the side closer to the interior of the cosmetic-dispensing spatula 1000, and an "outer" side refers to the side further away from the interior of the cosmetic-dispensing spatula 1000. The terms "front," "rear," "left," "right," "upper," and "lower" refer to the respective directions of the cosmetic-dispensing spatula 1000 when it is assumed that the side illustrated in FIG. 3A is the front side. That is, the terms refer to the respective directions for a cosmetic-dispensing spatula 1000 oriented with the spreader surface 813 of FIG. 3A facing the front. Of course, during actual use of a cosmetic-dispensing spatula 1000 according to an embodiment of the invention, the front, rear, left, right, upward, and downward directions mentioned in the specification may not necessarily coincide with the actual directions.

Figure 2:
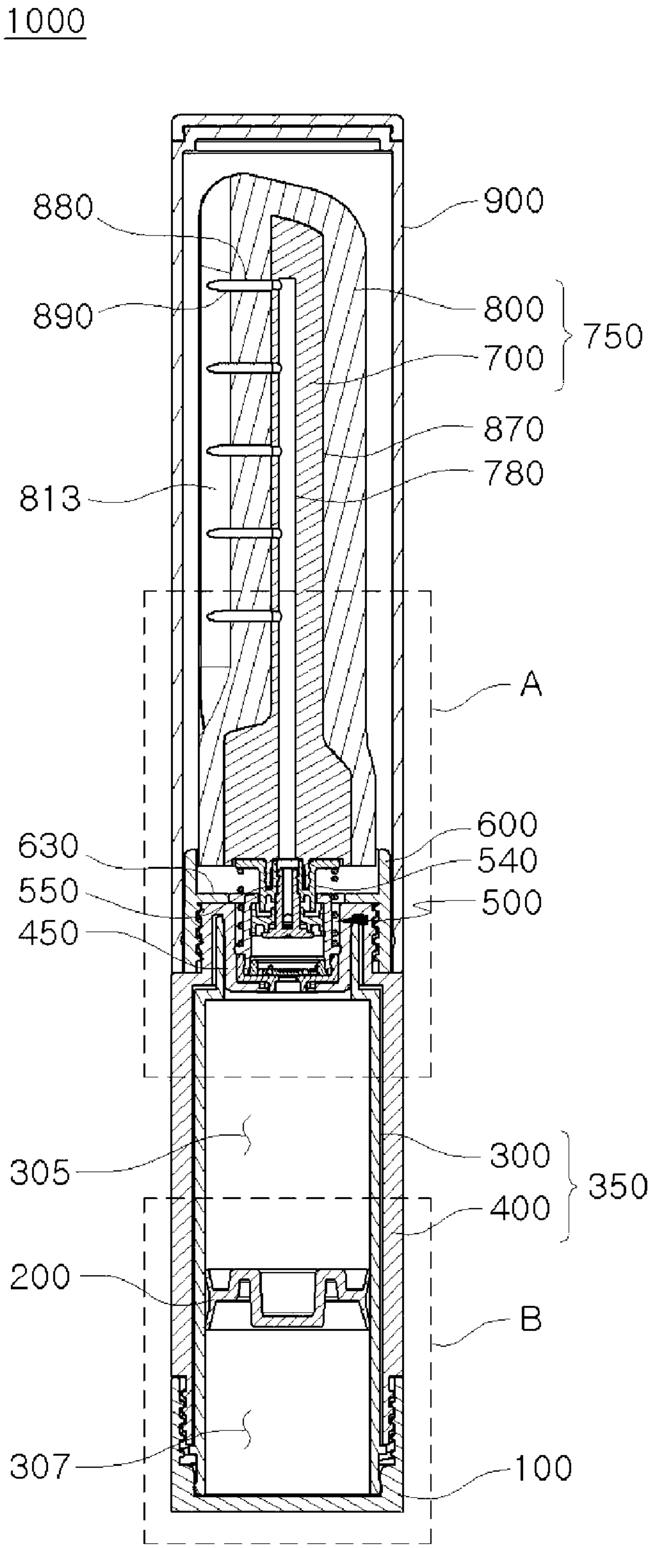
FIG. 2 is a vertical cross-sectional view illustrating the cosmetic-dispensing spatula shown in FIG. 1.
Figure 3B:
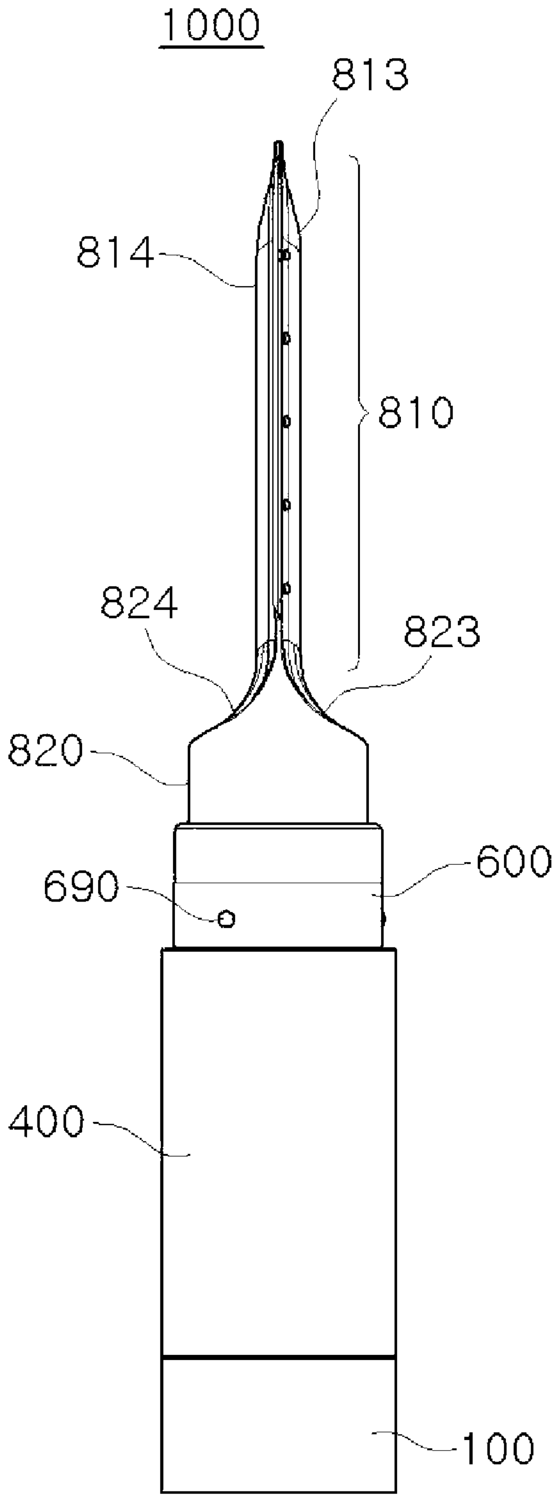
Figure 3C:
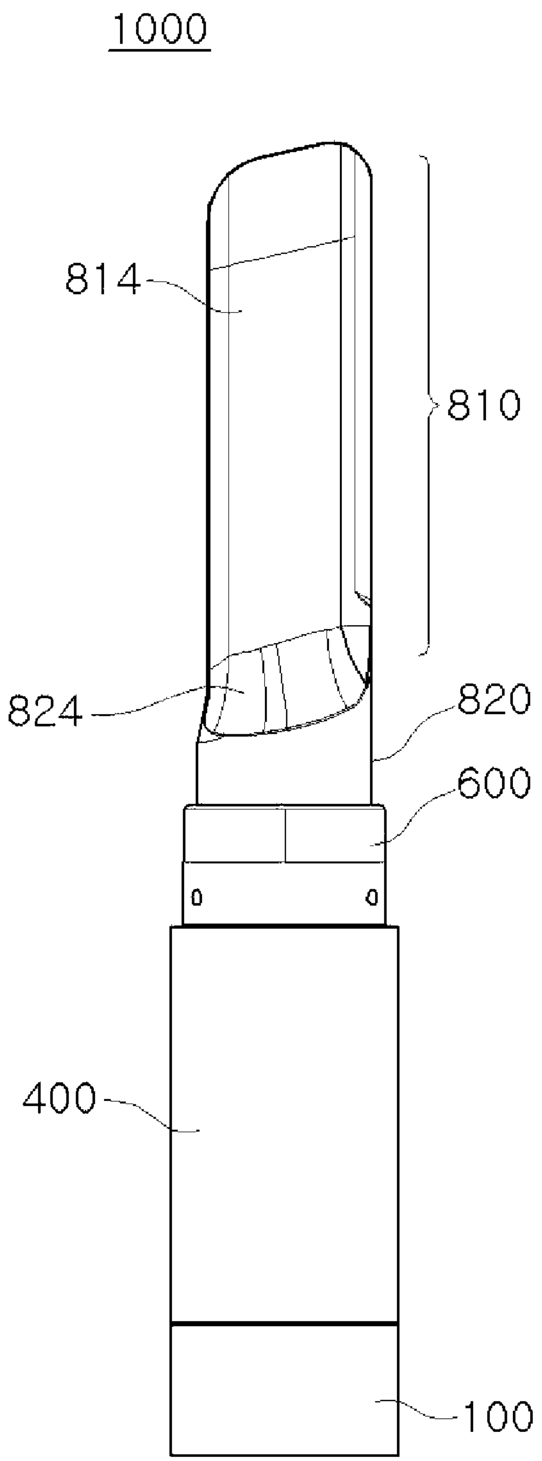
Figure 4A:
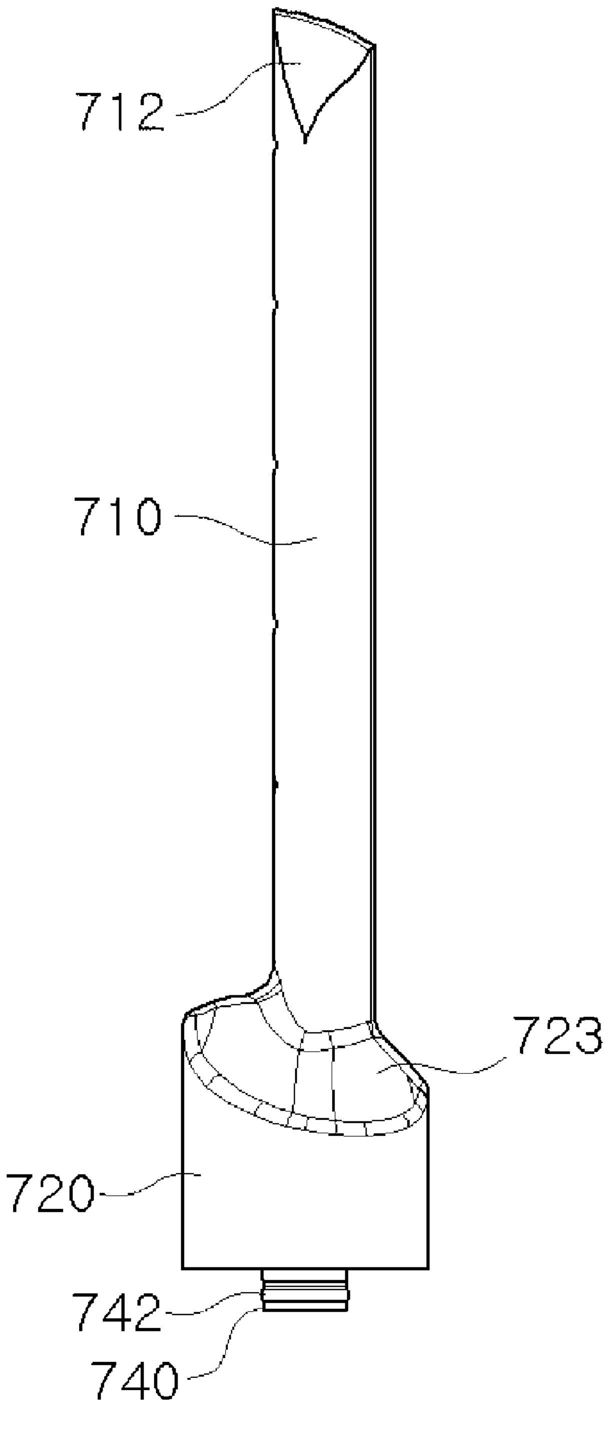
FIG. 4A, FIG. 4B, and FIG. 4C are elevational views illustrating the spatula core of the cosmetic-dispensing spatula shown in FIG. 1 from different angles.
Figure 4B:
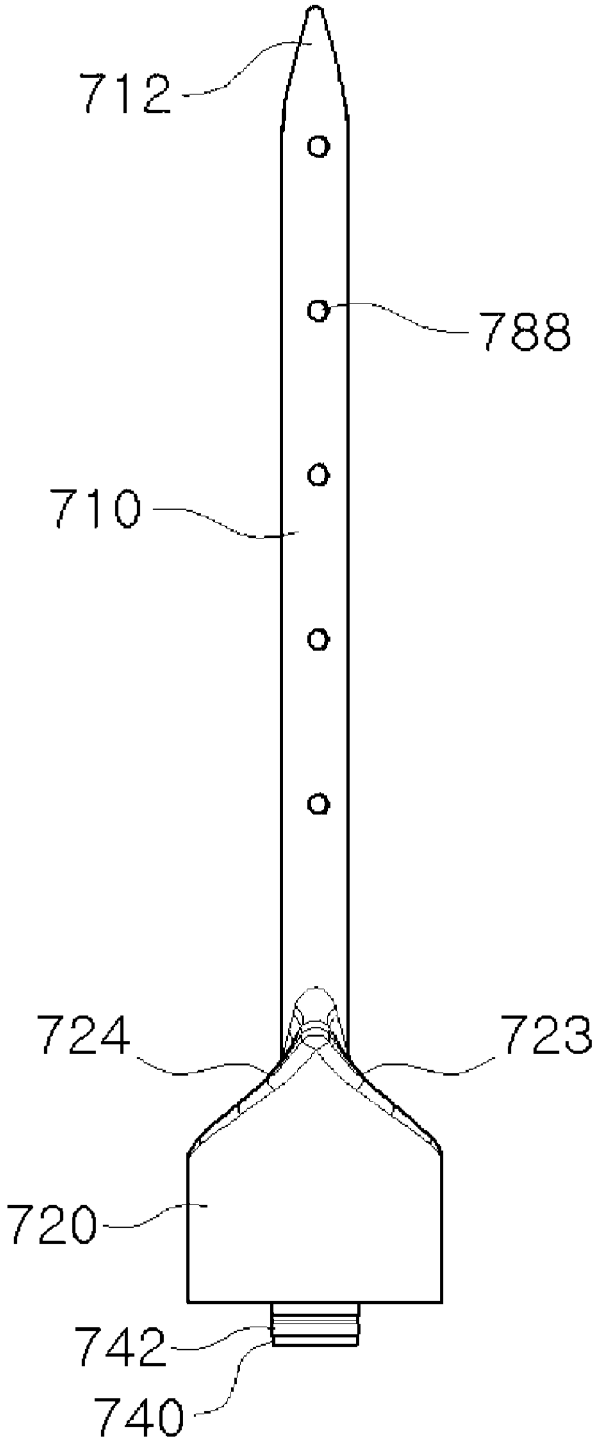
Figure 4C:
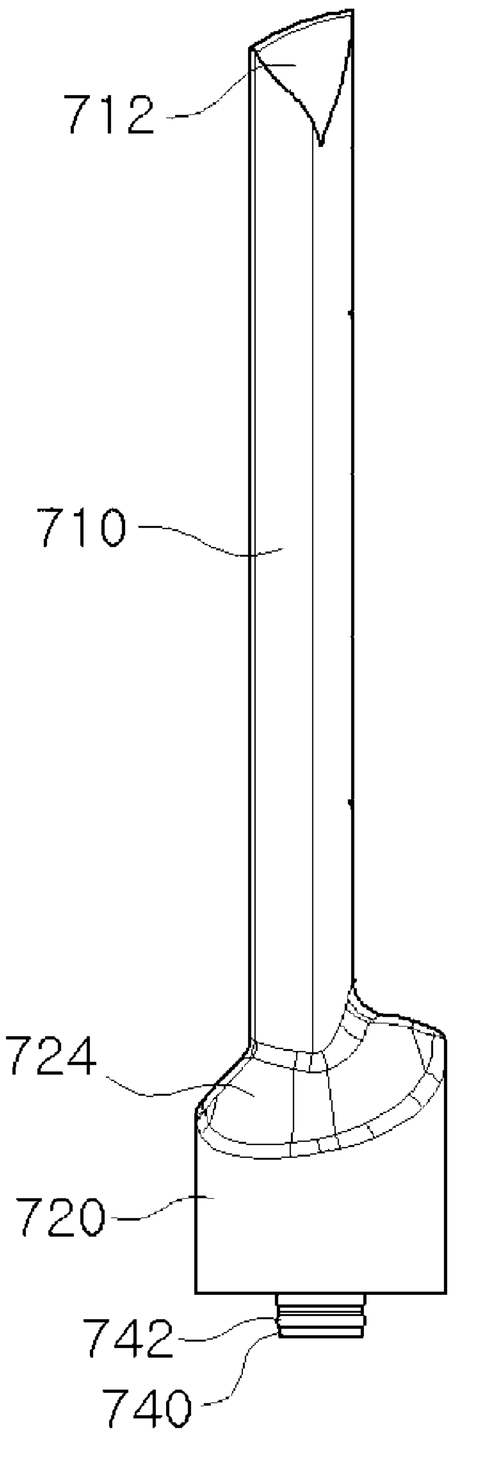
Figure 5:
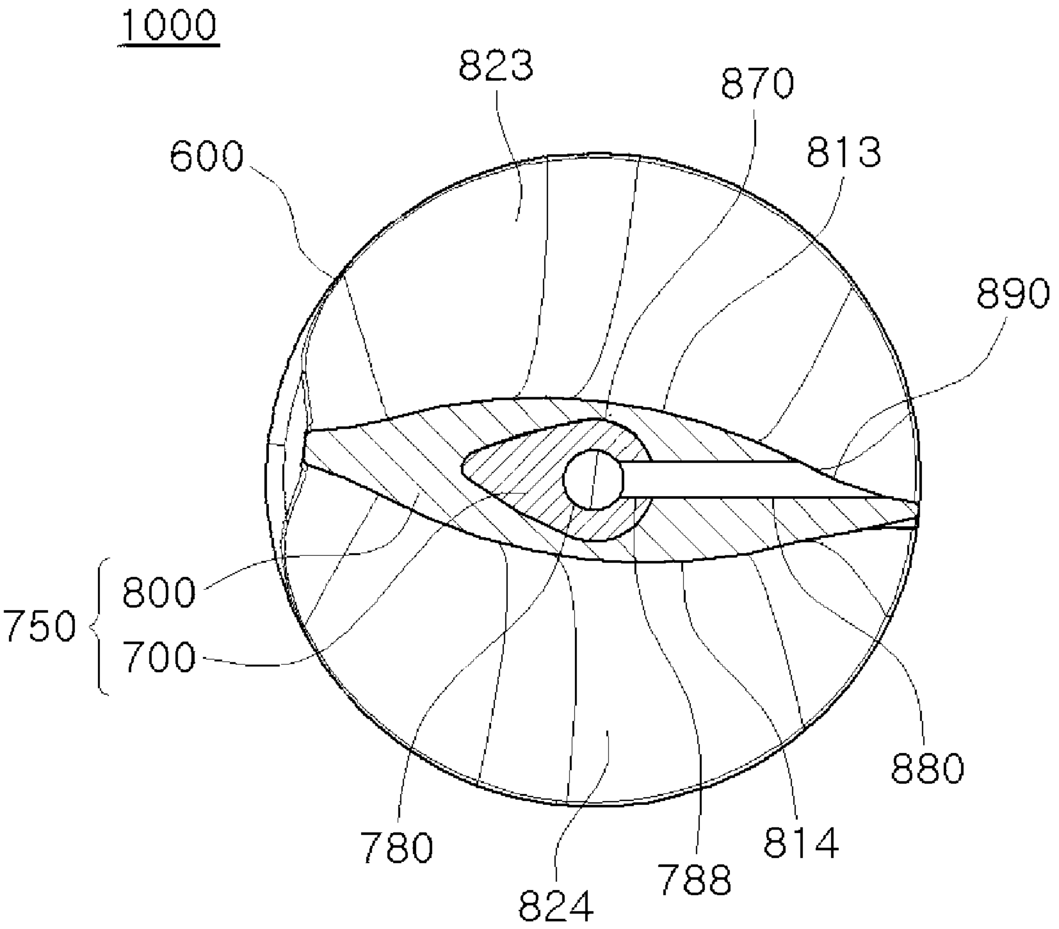
FIG. 5 is a horizontal cross-sectional view illustrating the cosmetic-dispensing spatula shown in FIG. 1.
Figure 6:
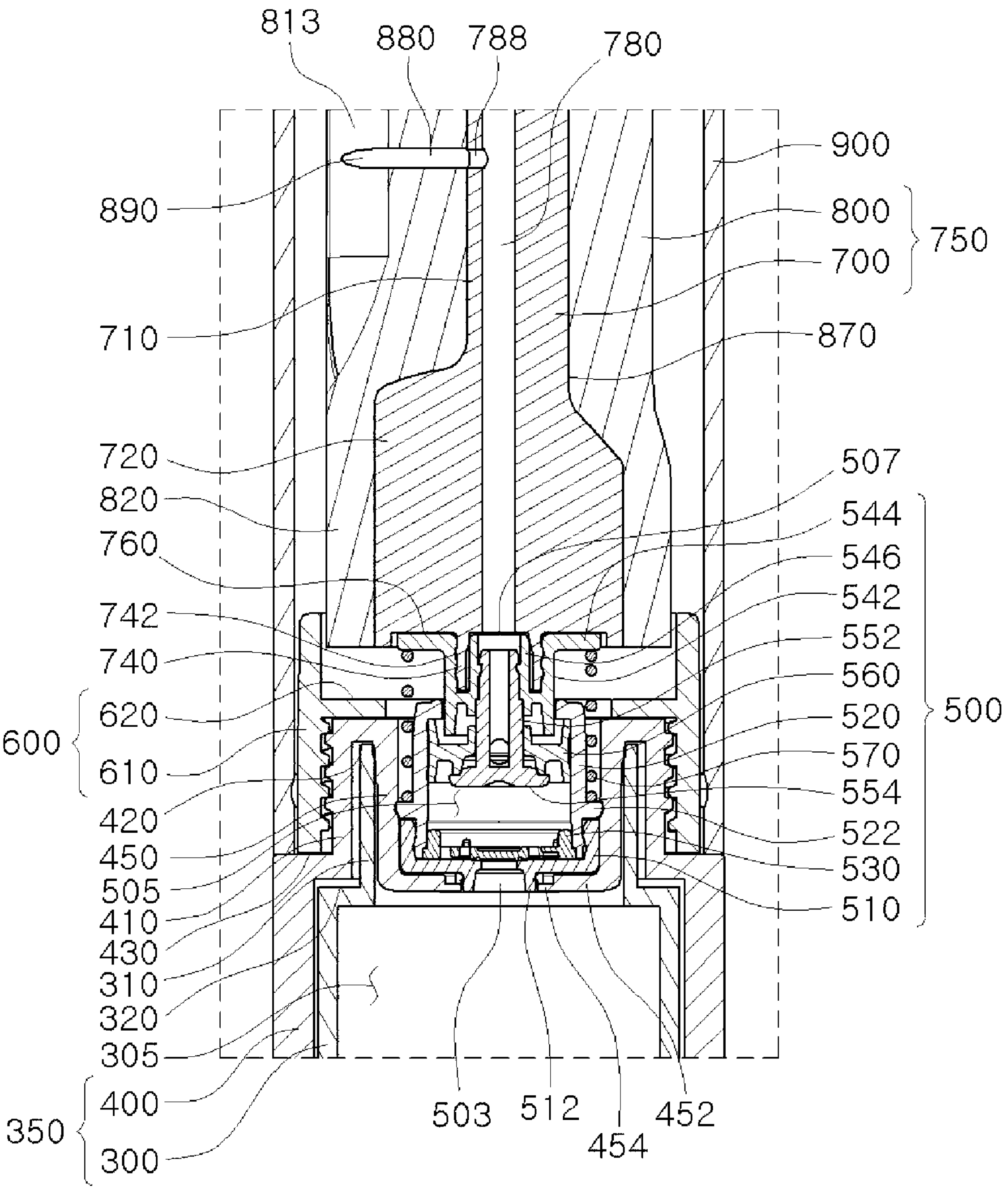
FIG. 6 is a magnified view of a portion of FIG. 2.
Figure 7:
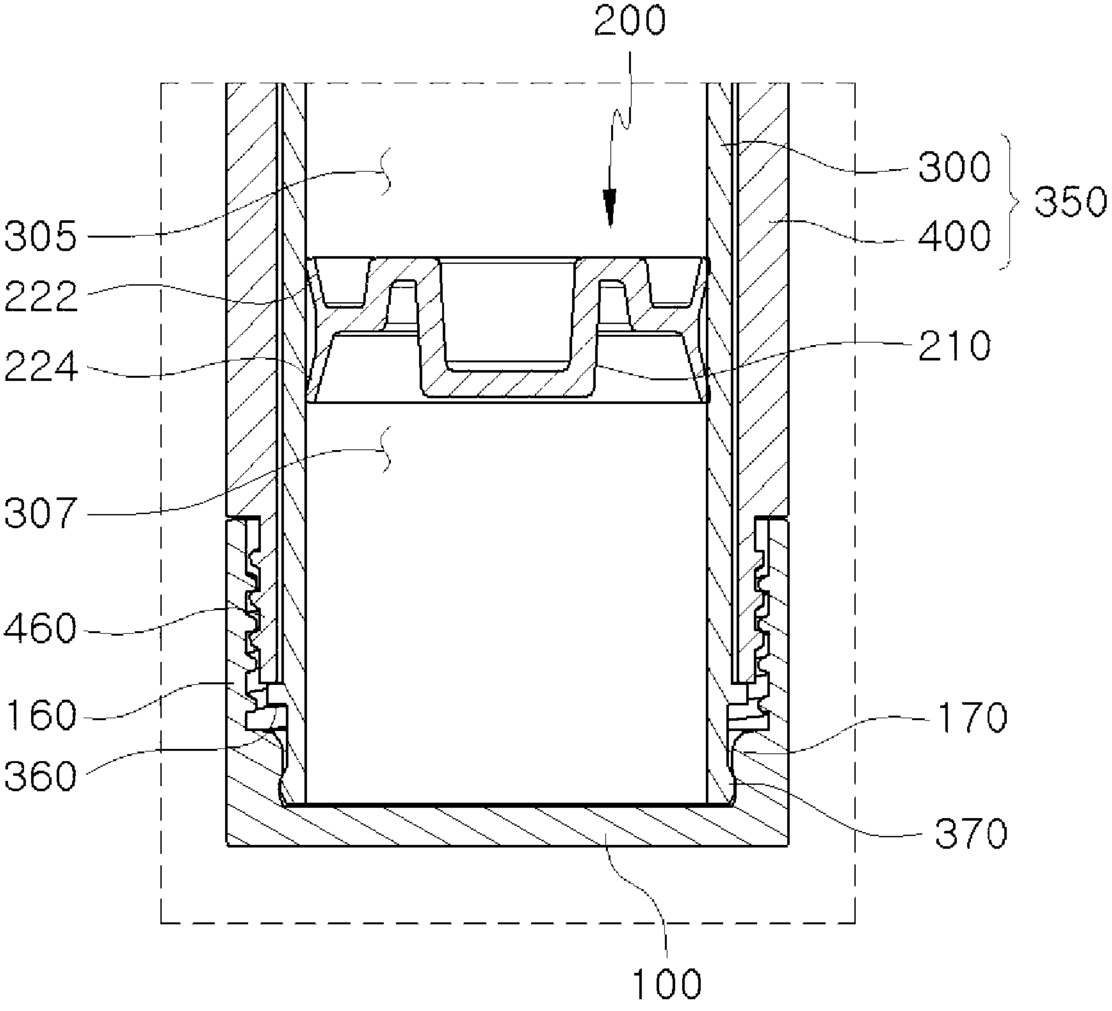
FIG. 7 is a magnified view of another portion of FIG. 2.
Figure 8:
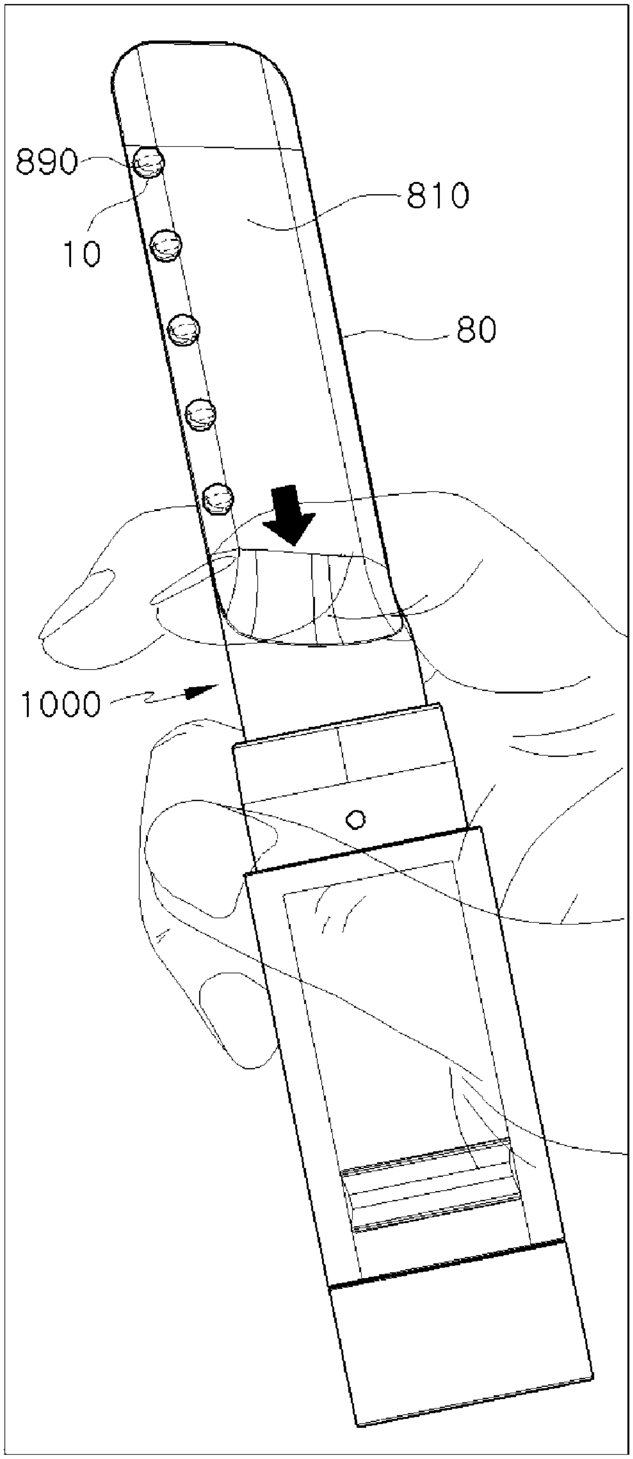
FIG. 8 is a conceptual view illustrating the use of the cosmetic-dispensing spatula shown in FIG. 1.

FIG. 1 is an exploded perspective view illustrating a cosmetic-dispensing spatula 1000 according to an embodiment of the invention, and FIG. 2 is a vertical cross-sectional view illustrating the cosmetic-dispensing spatula 1000 shown in FIG. 1. FIGS. 3A, 3B, and 3C are a front view, left view, and rear view of the cosmetic-dispensing spatula 1000 shown in FIG. 1, respectively, while FIGS. 4A, 4B, and 4C are a front view, left view, and rear view of the spatula core 700 of the cosmetic-dispensing spatula 1000 shown in FIG. 1, respectively. FIG. 5 is a horizontal cross-sectional view illustrating the cosmetic-dispensing spatula 1000 shown in FIG. 1, and FIGS. 6 and 7 are magnified views of portions of FIG. 2. FIG. 8 is a conceptual view illustrating the use of the cosmetic-dispensing spatula 1000 shown in FIG. 1.

Referring to FIGS. 1 to 8, a cosmetic-dispensing spatula 1000 according to an embodiment of the invention can largely include a case unit 350, a pump unit 500, and a spatula unit 750. When the user manipulates the cosmetic-dispensing spatula 1000, the pump unit 500 can supply the content stored within the case unit 350 at a surface of the spatula unit 750. As illustrated in FIG. 1, the cosmetic-dispensing spatula 1000 can include a lower cap 100, a piston 200, an inner case 300, an outer case 400, a pump unit 500, a shoulder 600, a spatula core 700, a spatula blade 800, and an overcap 900.

First, the case unit 350 can define a storage space 305, which may be open upward, on its inner side and can store a liquid content in the storage space 305. Incidentally, the content is omitted in all of the drawings of the present specification, with the exception of FIG. 8. The case unit 350 can include the lower cap 100, piston 200, inner case 300, and outer case 400.

The lower cap 100 can be configured to be coupled to a lower end of the outer case 400. For example, as illustrated in FIG. 7, the lower cap 100 can include a side wall 160, which may extend upward from the lower surface of the lower cap 100, and in an inner perimeter of which a female thread may be formed. The female thread of the side wall 160 can mate with a male thread formed on the coupling part 460 on the lower end of the outer case 400, so that the lower cap 100 can be strongly coupled to the outer case 400 by way of a screw joint. Also, at a lower portion of the side wall 160, a curb 170 can be formed that protrudes inward. As a detent protrusion 370 at a lower end of the inner case 300 is inserted under the curb 170, the lower cap 100 can be securely coupled with respect to the inner case 300 as well.

The piston 200 can be arranged within the storage space 305 of the case unit 350 such that the piston 200 tightly contacts the inner perimeter of the member forming the storage space 305. When the case unit 350 is being prepared, the piston 200 can be arranged in the storage space 305 after which the content can be filled over the piston 200. As the pump unit 500 supplies the content within the storage space 305 to the spatula unit 750, the amount of content remaining in the storage space 305 may decrease, and the piston 200 can move upward in a corresponding manner. Although the content in the storage space 305 is omitted in FIG. 2 and FIG. 7, the space above the piston 200 would be filled with the liquid content, while the space below the piston 200 would be filled with air. For the sake of convenience, the part of the storage space 305 under the piston 200 that is filled with air due to the expenditure of the content is referred to herein as the empty space 307.

The piston 200 can include a piston body 210 in the middle and contact parts 222, 224 formed on the outer side of the piston body 210. The piston body 210 can include an upwardly convex portion and a downwardly concave portion, which may increase the structural strength of the piston 200 and thus prevent the piston 200 from becoming deformed in shape even when a force is applied on the piston 200. Of course, the shape of the piston body 210 may vary depending on the material and shape, etc., of the piston 200.

The contact parts 222, 224 of the piston 200 can be formed in a small thickness suitable for tightly contacting the inner perimeter of the member forming the storage space 305, where the upper contact part 222 can have a diameter that increases towards the top so as to be shaped in an upwardly expanding manner, while the lower contact part 224 can have a diameter that increases towards the bottom so as to be shaped in a downwardly expanding manner. The contact parts 222, 224 can prevent the content within the storage space 305 from flowing into the empty space 307 below and likewise can prevent the air of the empty space 307 from flowing into the storage space 305 above.

The inner case 300 can be inserted and coupled within the outer case 400. In the example illustrated in the drawings, the inner case 300 forms the storage space 305 on its inner side. While the inner case 300 is inserted within the outer case 400, the lower cap 100 can be coupled to the lower end of the outer case 400, whereby the inner case 300 can be secured at the corresponding position.

The inner case 300 can be open both upward and downward, but as the piston 200 may be arranged to tightly contact the inner case 300 while within the storage space 305, the piston 200 can close the storage space 305 from below. A narrowed part 310 can be formed at an upper portion of the inner case 300, where the narrowed part 310 can have a reduced diameter compared to other portions of the inner case 300, so that a ledge 320 may be formed at a lower portion of the narrowed part 310.

The inner case 300 can be inserted into the outer case 400 and coupled. In the example illustrated in the drawings, the inner case 300 forms the storage space 305 on its inner side. While the inner case 300 is inserted within the outer case 400, the lower cap 100 can be coupled to the lower end of the outer case 400, whereby the inner case 300 can be secured at the corresponding position. At a lower portion of the inner case 300, an alignment flange 360 and a detent protrusion 370 can be formed as elements for aiding the coupling and alignment of the inner case 300. In certain embodiments, the alignment flange 360 and/or the detent protrusion 370 can be omitted.

The outer case 400 can be coupled with the pump unit 500 and can house the inner case 300 on its inner side. Referring to FIG. 6, a coupling sleeve 410 and a pump-holding part 450 can be formed at an upper portion of the outer case 400.

The coupling sleeve 410 can be the part formed on the upper portion of the outer case 400, where the coupling sleeve 410 can have a reduced diameter compared to other portions of the outer case 400, so that a ledge 430 may be formed at a lower portion of the coupling sleeve 410. A male thread can be formed on the outer perimeter of the coupling sleeve 410, and this male thread can mate with the female thread formed in the inner perimeter of the cylinder part 610 of the shoulder 600 to form a screw joint.

The pump-holding part 450 can be formed as a structure that is recessed downward and open upward at an upper portion of the outer case 400. A hole can be formed in the lower surface 452 of the pump-holding part 450, and a contact part 454 can be formed around the hole. The contact part 454 can be formed in a thickness and shape that allows a slight degree of elastic deformation, so that when an inlet member 512 of the pump unit 500 is inserted through the hole in the lower surface 452 of the pump-holding part 450, the inner perimeter of the contact part 454 can tightly contact the outer perimeter of the inlet member 512 and thus seal the storage space 305.

A connecting part 420, which may form the upper end of the outer case 400, can connect the upper end of the coupling sleeve 410 with the upper end of the pump-holding part 450. A small gap may be formed between the inner perimeter of the coupling sleeve 410 and the outer perimeter of the pump-holding part 450, and when the inner case 300 is inserted into the outer case 400, the narrowed part 310 of the inner case 300 may be forced into the gap between the coupling sleeve 410 and the pump-holding part 450 to form a seal at the corresponding portion and at the same time firmly secure the inner case 300 at the correct position.

Referring to FIG. 7, a coupling part 460 can be formed at a lower portion of the outer case 400, where the coupling part 460 can have a reduced diameter compared to the main portion of the outer case 400, and a male thread can be formed on the outer perimeter of the coupling part 460. The male thread of the coupling part 460 can mate with the female thread in the side wall 160 of the lower cap 100, so that the lower cap 100 may be coupled to the outer case 400 by way of a screw joint. When the lower cap 100 is coupled to the outer case 400, the outer perimeter of the side wall 160 of the lower cap 100 can form a natural continuing surface that is flush with the outer surface of the outer case 400 above the coupling part 460.

In the example illustrated in the drawings, the case unit 350 is divided into the inner case 300 and the outer case 400, and the lower cap 100 is coupled to the lower end. This structure makes it possible to form a separate refill unit 250 with the piston 200 and the inner case 300. That is, a refill unit 250 according to an embodiment of the invention, for example, can be manufactured and distributed as a separate unit in which the piston 200 is positioned at a lower part of the storage space 305 of the inner case 300, the content is filled over the piston 200, and the upper end of the inner case 300 is closed with a sealing tape (not shown), etc.

When the content in the cosmetic-dispensing spatula 1000 is completely depleted after prolonged use, the user can separate the lower cap 100, remove the inner case 300 together with the piston 200 within, and insert a new refill unit 250 into the outer case 400 to thereby replenish the content. Of course, it is not absolutely necessary that certain parts of the case unit 350 be formed as a replaceable refill unit 250. In certain embodiments, some or all of the lower cap 100, the inner case 300, and the outer case 400 can be integrated as a single body, in which case the detailed features of the above components may be modified.

The pump unit 500 can be coupled to an upper portion of the case unit 350 and can serve to supply the content from the storage space 305 to the spatula unit 750. To this end, the pump unit 500 can include parts that are secured to the case unit 350, parts that are moveable in relation to the case unit 350, and a spring 570 that is positioned in-between. When a portion of the pump unit 500 is pressed down as manipulated by the user, the pump unit 500 can discharge the content that was kept in a pump space 505 through an outlet 507, and when the pressing is removed, the portion of the pump unit 500 may be returned to its original position by the restoring force of the spring 570, in the process of which the content in the storage space 305 can be suctioned through an inlet 503 and replenished in the pump space 505. Referring to FIG. 6, a pump unit 500 according to an embodiment of the invention can be installed on the inner side of the pump-holding part 450 of the case unit 350 and can include a pump cover 510, a pump housing 520, a disk 530, a valve 540, a guide 550, a pump piston 560, and a spring 570.

The pump cover 510 can be installed at a lower portion on the inner side of the pump-holding part 450 of the case unit 350. The pump cover 510 can serve to seal the area of contact between the pump unit 500 and the case unit 350 while also supporting other components of the pump unit 500. The outer perimeter and bottom surface of the pump cover 510 can be formed in shapes corresponding to the inner perimeter and lower surface of the pump-holding part 450. The inlet 503 can be formed in the center of the pump cover 510, and an inlet member 512 protruding downward can be formed around the inlet 503. When the pump cover 510 is placed in the pump-holding part 450, the inlet member 512 can be forced through the hole in the lower surface 452 of the pump-holding part 450, and the contact part 454 of the pump-holding part 450 can be placed in tight contact with the outer perimeter of the inlet member 512. As the pump cover 510 forms surface contact with the pump-holding part 450 over a large area, a high sealing performance can be provided at this portion, and a flow may occur between the case unit 350 and the pump unit 500 through the inlet 503 only.

The pump housing 520 can be coupled to an upper portion of the pump cover 510 to form the pump space 505 on its inner side. A flange 522 can be formed on the outer perimeter of the pump housing 520. The flange 522 can serve to support the lower end of the spring 570. The upper end of the pump cover 510 can extend up to the lower surface of the flange 522 of the pump housing 520. In an upper surface of the pump housing 520, a hole can be formed through which portions of the valve 540 and the guide 550 may pass. The pump housing 520 can be formed in a size that would allow the pump space 505 to have a volume corresponding to a suitable amount of content that would be provided through the dispensing holes 890 when the user manipulates the cosmetic-dispensing spatula 1000 according to an embodiment of the invention.

The disk 530 can serve as a sort of check valve that permits the flow of the content in one direction only and can be mounted at a lower portion of the pump housing 520. The disk 530 can be arranged over the inlet 503 of the pump cover 510 and may normally block the inlet 503, but when the pressure inside the pump space 505 is decreased, the disk 530 may move up and open the inlet 503. Thus, the disk 530 may allow the content to flow only from under the inlet 503 upward and prevent any flow from above the inlet 503 downward.

The valve 540 can be coupled to the spatula unit 750 and to the guide 550 and can manipulate the guide 550 and the pump piston 560 by way of the pressure applied by the user and the restoring force of the spring 570. The valve 540 can have a channel formed on its inner side that penetrates through the vertical length of the valve 540 and can include an outer cylinder 542, a coupling flange 544, and an inner cylinder 546.

The outer cylinder 542 can form the main portion of the valve 540 and can have an outer diameter corresponding to the inner diameter of the hole formed in the upper portion of the pump housing 520. The length of the outer cylinder 542 along the up-down direction can be formed to correspond to the movement range of the valve 540 and the spatula unit 750 coupled to the valve 540. A coupling boss 740 provided on the spatula unit 750 can be inserted on the inner side of the outer cylinder 542, where a detent protrusion and/or a detent indentation can be formed on the inner perimeter of the outer cylinder 542 for a more secure coupling.

The coupling flange 544 can be configured as a flange that expands outward from an upper end of the outer cylinder 542. The coupling flange 544 can contact a lower surface of the spatula unit 750, so as to allow a firm securing of the valve 540 onto the spatula unit 750 and to transfer a force applied on the spatula unit 750 effectively to the valve 540. The coupling flange 544 can also provide a surface on which to couple the upper end of the spring 570.

The inner cylinder 546 can have a channel formed on its inner side that penetrates through the vertical length of the inner cylinder 546, and the guide 550 can be inserted in and coupled to this channel. A detent protrusion and/or a detent indentation can be formed on the inner perimeter of the inner cylinder 546 for a more secure coupling with the guide 550. The inner cylinder 546 can be formed with a particular gap from the outer cylinder 542, and the coupling boss 740 provided on the spatula unit 750 can be inserted into this gap.

The guide 550 can be coupled to the valve 540 and can be configured to move up and down within the pump housing 520 according to a pressure applied by the user. The guide 550 can include a stem part 552, in which an empty channel that penetrates through the vertical length of the stem part 552 may be formed, and a head part 554, which may be formed at the lower end of the stem part 552. The stem part 552 can have an elongated form with the channel formed on the inner side to have the general shape of a hollow cylinder, and one or more pump inlet holes (not shown) formed in the stem part 552 can connect the channel on the inside with the exterior of the guide 550. The head part 554 can be positioned within the pump space 505 of the pump housing 520 but can have an outer diameter that is larger than the inner diameter of the pump piston 560 so as to form a curb below the pump piston 560.

The pump piston 560 can have a hole formed in the middle so as to have a generally annular shape and can be mounted such that the stem part 552 of the guide 550 penetrates through the hole in the middle of the pump piston 560. The pump piston 560 can be configured such that the outer perimeter of the pump piston 560 tightly contacts the inner perimeter of the pump housing 520 and the inner perimeter of the pump piston 560 tightly contacts the stem part 552 of the guide 550. When the spatula unit 750 is not pressed, the pump piston 560 can be arranged at a position that closes the pump inlet holes (not shown) formed in the guide 550.

The spring 570 can be coupled between the valve 540 and the pump housing 520 and can serve to return the valve 540, guide 550, and spatula unit 750 to their original positions by an elastic force when the external force applied by the user is removed. In the example illustrated in the drawings, the pump housing 520 and the valve 540 are inserted through the hole in the middle of the spring 570, with the upper end of the spring 570 coupled to the lower surface of the coupling flange 544 and the lower end of the spring 570 coupled to the upper surface of the flange 522 of the pump housing 520.

When the user presses down on the spatula unit 750, the spatula unit 750, together with the valve 540 and the guide 550 that are coupled thereto, may move down, but the pump piston 560 may not move down immediately, due to the friction caused by tight contact with the pump housing 520. As the pump piston 560 does not move down but the guide 550 does, the pump inlet holes (not shown) of the guide 550 can be opened. After the guide 550 has moved down a particular distance, the lower end of the valve 540 may press on the pump piston 560 and cause the pump piston 560 to move down as well, but at this time, the pump inlet holes (not shown) of the guide 550 can maintain an open state. As the guide 550 and the pump piston 560 move downward, the volume of the pump space 505 may be decreased, and the increase in pressure can cause the content that had been drawn into the pump space 505 to be suctioned into the open pump inlet holes (not shown). The content that enters the pump inlet holes (not shown) can be discharged through the outlet 507 and be supplied to the spatula unit 750.

A pump unit 500 according to an embodiment of the invention can be configured as in the drawings for easy manufacture and assembly, but it is apparent that certain components of the pump unit 500 can be fabricated in an integrated form. Also, in certain embodiments, certain parts of the pump unit 500 and the outer case 400 can be fabricated in an integrated form.

The shoulder 600 can be coupled to an upper portion of the case unit 350 to support the spatula unit 750, and guide the movement of the spatula unit 750, and shield the pump unit 500 from the exterior. The shoulder 600 can include a cylinder part 610 and an inner flange 620.

The cylinder part 610 can correspond to the main portion of the shoulder 600 and can be shaped as a hollow cylinder that is open both upward and downward. In the inner perimeter at a lower portion of the cylinder part 610 (for example, at a portion below the inner flange 620), a female thread can be formed, which may mate with the male thread formed on the coupling sleeve 410 of the outer case 400, so that the shoulder 600 can be coupled to the case unit 350 by way of a screw joint. A female thread can be formed in the inner perimeter of a portion of the cylinder part 610 below the inner flange 620, where the female thread may mate with the male thread formed on the coupling sleeve 410 of the outer case 400, so that the shoulder 600 can be coupled to the case unit 350 by way of a screw joint. When the shoulder 600 is coupled to the case unit 350, the lower end of the cylinder part 610 can contact the ledge 430 formed on the case unit 350. One or more detent protrusions 690 for aiding the coupling of the overcap 900 can also be formed on the outer perimeter of the cylinder part 610.

At an upper portion of the cylinder part 610 (for example, at a portion above the inner flange 620), the inner perimeter can be formed with a smooth surface. At the upper portion of the cylinder part 610, a lower portion of the spatula unit 750 can be inserted to the inner side of the cylinder part 610, and as such, the cylinder part 610 can be made from a material that does not provide a high friction so as not to inhibit the movement of the spatula unit 750. The length of the cylinder part 610 along the up-down direction can be made to correspond to the movement range of the spatula unit 750.

The inner flange 620 can protrude inward from a particular position of the cylinder part 610, and a hole can be formed in the middle through which the pump unit 500 may pass. When the shoulder 600 is coupled to the case unit 350, the inner flange 620 can contact the upper end of the case unit 350. While the inner flange 620 can aid the secure coupling and alignment of parts, the inner flange 620 can be omitted in certain embodiments.

In certain embodiments of the invention, the shoulder 600 can be fabricated together with any one of the case unit 350, pump unit 500, and spatula unit 750 in an integrated form, and in certain other embodiments, the shoulder 600 can be omitted entirely. In such cases, the detailed features of certain components may be modified.

The spatula unit 750 may form the upper part of the cosmetic-dispensing spatula 1000. The spatula unit 750 can be coupled to an upper portion of the pump unit 500 and can include a discharge channel 780 on the inside that extends along the up-down direction. The discharge channel 780 can communicate with the outlet 507 of the pump unit 500.

A spreader surface 813 may be formed on one side of the spatula unit 750, where the spreader surface 813 may be a flat or curved surface used by the user to apply the content onto the skin. The spatula unit 750 can be fabricated by using stainless steel, silicone, plastic, glass, or another material.

One or more dispensing holes 890 may be formed in the spreader surface 813 of the spatula unit 750, and each of the dispensing holes 890 may communicate with the discharge channel 780 inside the spatula unit 750. Thus, when the pump unit 500 is operated to discharge the content to the outlet 507, the content can pass through the discharge channel 780 and be dispensed at the dispensing holes 890 in the form of droplets 10 (see FIG. 8), allowing the user to immediately use the suitable amount of content that is dispensed onto the spreader surface 813.

According to an embodiment of the invention, the spatula unit 750 can be formed by individually fabricating the spatula core 700 and the spatula blade 800 and then coupling the two together. The spatula core 700 and the spatula blade 800 can be fabricated from the same material or from different materials. In certain embodiments, the spatula blade 800 can include at least one material selected from stainless steel, silicone, plastic, and glass.

The spatula core 700 can be the part inside which the discharge channel 780 is formed and can be coupled with the spatula blade 800 as the spatula core 700 is inserted into a coupling slot 870 formed in the spatula blade 800. The spatula core 700 can be composed of a channel part 710 and a base part 720.

The channel part 710 can be formed in an elongated shape along the up-down direction with the discharge channel 780 formed on the inside. One or more dispensing channels 788 that communicate with the discharge channel 780 can also be formed in the channel part 710, and when the spatula core 700 is inserted into the coupling slot 870 of the spatula blade 800, the dispensing channels 788 can connect with the dispensing channels 880 that are formed in the spatula blade 800 and lead to the dispensing holes 890. In certain embodiments, at least one of the dispensing channels 788 can have a diameter that is different from the diameters of the other dispensing channels 788. This can help in ensuring that the content is dispensed in even amounts, even though the dispensing holes 890 are at different heights.

As illustrated in FIG. 5, the channel part 710 can preferably have a horizontal cross section that is not of a circular shape and is not symmetrical with respect to the left-right direction. Such a cross-sectional shape can ensure that the channel part 710 is inserted into the coupling slot 870 only in one orientation during the assembly of the spatula unit 750 and can align the channel part 710 in the correct orientation so that, when the channel part 710 is inserted, the dispensing channels 788 of the spatula core 700 may be precisely connected with the dispensing channels 880 of the spatula blade 800. The channel part 710 can have a curved surface overall, but the upper end 712 of the channel part 710 can be shaped to form an acute angle both along the front-rear direction and the left-right direction, as illustrated in FIG. 4. Such a structure can enable the channel part 710 to be inserted in the coupling slot 870 more easily and, once inserted, continue its entry up to the end without any great resistance from friction.

The base part 720 can be located at a lower portion of the channel part 710 and can form the base of the spatula core 700. Pressing parts 723, 724 can be formed on the base part 720 in a corresponding manner under the below-mentioned pressing parts 823, 824 of the spatula blade 800. When the user presses down on the pressing part 823, 824 of the spatula blade 800, the force applied by the user can be transferred to the pressing part 823, 824 of the spatula core 700, and the entire spatula unit 750 can be moved downward.

The coupling boss 740 and an alignment groove 760 can be formed in the bottom surface of the base part 720. The coupling boss 740 can protrude downward from around the entrance of the discharge channel 780, while the alignment groove 760 can be formed in a concave shape around the coupling boss 740. As described above, the coupling boss 740 can be used for the coupling with the pump unit 500 and, for example, can be pressed into the gap between the outer cylinder 542 and inner cylinder 546 of the valve 540. For a more secure coupling, a detent protrusion and/or a detent indentation can be formed in the outer perimeter of the coupling boss 740. When the coupling boss 740 is thus coupled to the valve 540, the coupling flange 544 of the valve 540 can be inserted in the alignment groove 760. The coupling flange 544 and the alignment groove 760 can help to couple the spatula unit 750 and the pump unit 500 to each other in a more stable manner and can enable the manufacturer to check whether or not the spatula unit 750 and pump unit 500 are coupled properly.

The spatula blade 800 can be the part that includes the spreader surface 813 in which the dispensing holes 890 are formed and can also have a coupling slot 870 formed on its inner side into which the spatula core 700 may be inserted. The coupling slot 870 can be formed in a shape corresponding to the exterior shape of the spatula core 700. The spatula blade 800 can be composed of a blade part 810 and a base part 820.

The blade part 810 can form the upper portion of the spatula blade 800 and can have the spreader surface 813 formed on its front surface. The spreader surface 813 can be shaped as if it were receded inward from the circular cross section of the case unit 350 to form a flat or curved surface. The spreader surface 813 can correspond to the part with which the user applies the content on the skin. One or more dispensing holes 890 can be formed in the spreader surface 813, where each of the dispensing holes 890 can be connected by the discharge channel 780 to the outlet 507 of the pump unit 500.

According to a preferred embodiment of the invention, the discharge channel 780 can be formed in the center of the blade part 810, as in the example illustrated in FIG. 5, and the dispensing holes 890 can be formed on one side of the spreader surface 813 with respect to the left-right direction. In the blade part 810, there can be dispensing channels 880 formed, which may connect the respective dispensing holes 890 to the discharge channel 780. The positions, structures, and lengths of the dispensing channels 880 may vary depending on the positions of the discharge channel 780 and the dispensing holes 890. In certain embodiments, at least one of the dispensing channels 880 can have a diameter that is different from the diameters of the other dispensing channels 880. This makes it possible to dispense the content in even amounts, even though the dispensing holes 890 are at different heights.

According to an embodiment of the invention, a curved surface 814 can be formed on the rear side of the blade part 810 also, where the curved surface 814 can be shaped as if it were receded inward from the circular cross section of the case unit 350 in a manner similar to that of the spreader surface 813. The main difference between the spreader surface 813 on the front of the blade part 810 and the curved surface 814 on the rear of the blade part 810 is that the dispensing holes 890 are formed in the spreader surface 813 whereas the dispensing holes 890 are not formed in the curved surface on the rear side. Of course, the curved surface 814 on the rear side can have a completely different shape from that of the spreader surface 813.

Referring to FIG. 5, the blade part 810 can be formed such that the front side and the rear side are substantially symmetrical. However, the direction in which the dispensing channels 880 extend may not coincide with the direction of the plane of symmetry corresponding to the symmetrical horizontal cross section of the blade part 810. This is because the dispensing holes 890 are formed not in the edge of the blade part 810 but on the spreader surface 813, which corresponds to the front surface of the blade part 810. As the dispensing channels 880 extend in directions that intersect with the surface of the spreader surface 813, the dispensing holes 890 can have an elliptical shape. The elliptical shapes of the dispensing holes 890 allow the droplets 10 on the spreader surface 813 to remain in the dispensing holes 890 for longer durations.

In an embodiment of the invention, the front side and rear side of the channel part 710 of the spatula core 700 can also be substantially symmetrical, but the direction of the plane of symmetry corresponding to the symmetrical horizontal cross section of the spatula core 700 and the coupling slot 870 may not coincide with the direction of the plane of symmetry corresponding to the symmetrical horizontal cross section of the spatula blade 800. This can provide the effect of allowing a comparatively easier manufacture for the spatula core 700.

The base part 820 can be located at a lower portion of the blade part 810 and can form the base of the spatula blade 800. Whereas the blade part 810 has a reduced width along the front-rear direction due to the spreader surface 813 and the curved surface 814 on the rear side, the base part 820 can have a circular cross section and can have its lower portion inserted into the upper portion of the shoulder 600. The base part 820 can be regarded as protruding outward from the spreader surface 813 and from the curved surface 814 on the rear side, as a result of which the pressing parts 823, 824 can be formed at an upper portion of the base part 820. Of course, since the pressing parts 823, 824 are provided as protrusions by which the user can press down the spatula unit 750, the pressing parts 823, 824 can be implemented in any of a variety of forms.

When the user presses down on the pressing parts 823, 824 or moves down the spatula unit 750 in some other way, the spatula unit 750 may move the valve 540 of the pump unit 500 downward. The spatula unit 750 can move within a range permitted by the spring 570 of the pump unit 500, and the lower end of the spatula unit 750 may preferably remain on the inner side of the shoulder 600 over the entire range of movement.

When the spatula unit 750 and the valve 540 are moved downward, the volume of the pump space 505 inside the pump unit 500 may be reduced, and the pressure in the pump space 505 may be increased. As a result, the content that was kept in the pump space 505 may pass through the outlet 507, the discharge channel 780, and the dispensing channels 788, 880, to be dispensed through the one or more dispensing holes 890.

When the user removes the pressure, the spring 570 of the pump unit 500 can return the valve 540 and the spatula unit 750 to their original positions. This will increase the volume of the pump space 505 again and hence decrease the pressure in the pump space 505, as a result of which the disk 530 can be opened, and the content of the storage space 305 can be replenished in the pump space 505 through the inlet 503. Since air cannot enter the storage space 305 but can enter the empty space 307 below, the pressure decrease of the storage space 305 may cause the piston 200 to move upward.

Referring to FIGS. 3A to 3C, the pressing parts 823, 824 can protrude outward from the spreader surface 813 and the curved surface 814 on the rear side, respectively. As illustrated in the drawings, in cases where the dispensing holes 890 are formed on one side of the spreader surface 813 with respect to the left-right direction, the pressing parts 823, 824 can be curved into slopes such that one side is formed higher than the opposite side. Also, as in the illustrated example, each of the pressing parts 823, 824 can be formed such that its inner side is higher than its outer side. Such a shape of the pressing parts 823, 824 allows the user to easily press the pressing parts 823, 824 with one or more fingers while holding the cosmetic-dispensing spatula 1000. The curve formed by the upper surface of a pressing part 823, 824 can have a radius of curvature corresponding to the curve of the side surface of a typical user's finger.

For example, the user may hold the case unit 350 with the right hand such that the dispensing holes 890 are directed towards the face and, while in this state, can press the pressing part 823 at the lower portion of the spreader surface 813 with the right thumb, press the pressing part 824 at the lower portion of the curved surface 814 with the right index finger, or press both of the pressing parts 823, 824 with the index finger and the middle finger as in the illustration of FIG. 8. This will cause the content to be dispensed as droplets 10 on the side of the spreader surface 813 closer to the user's face, and the user can immediately apply the content on the face. The positions of the dispensing holes 890 can be selected such that the dispensed content droplets 10 remain only on the spreader surface 813 and do not flow to the curved surface 814 on the rear side. Thus, the dispensed content can be prevented from getting onto a surface other than the spreader surface 813 and contaminating a nearby object by accident. Of course, the user would be able to intentionally use the curved surface 814 on the rear of the spreader surface 813 as a means for applying or spreading the content as necessary.

The overcap 900 can be coupled to the case unit 350 to house the spatula unit 750 therein. The overcap 900 can have its lower end rest on the ledge 430 of the case unit 350 and can have a detent groove formed in its inner perimeter for mating with the detent protrusion 690 formed on the outer perimeter of the shoulder 600. The overcap 900 can isolate the spatula unit 750 from the outside to protect the spreader surface 813 from contamination or prevent the content on the spreader surface 813 from contaminating a nearby object.

As set forth above, a cosmetic-dispensing spatula 1000 according to an embodiment of the invention can improve user convenience by allowing the user to manipulate the cosmetic-dispensing spatula 1000 with a simple action using one or more fingers while holding the cosmetic-dispensing spatula 1000 in one hand. The cosmetic-dispensing spatula 1000 can also improve user convenience by dispensing the content evenly on the spreader surface 813 in the form of small droplets 10.

Since the dispensing holes 890 of an elliptical shape are formed only on the spreader surface 813, the content dispensed in the form of droplets 10 at the dispensing holes 890 may not easily flow down and may not get on parts other than the spreader surface 813. This can greatly reduce the possibility of the content contaminating a nearby object due to user negligence.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A cosmetic-dispensing spatula comprising:

a case unit having therein an upwardly open storage space and configured to store a liquid content in the upwardly open storage space;

a pump unit coupled to an upper portion of the case unit, the pump unit having an inlet configured to communicate with the upwardly open storage space disposed at a lower portion of the pump unit and an outlet defined in an upper portion of the pump unit, the pump unit being configured to suction the liquid content from the inlet and discharge the liquid content at the outlet; and a spatula unit coupled to the upper portion of the pump unit and having therein a discharge channel extending along a first direction, wherein the spatula unit has a spreader surface defined on a first surface of the spatula unit, wherein the discharge channel is configured to communicate with the outlet, wherein the spreader surface has a dispensing hole defined therein, the dispensing hole being configured to communicate with the discharge channel, wherein the pump unit is configured to discharge the liquid content when the spatula unit is pressed downward, wherein the case unit comprises:

an outer case coupled with the pump unit; and an inner case coupled to an inside of the outer case and forming the upwardly open storage space, wherein the outer case has a pump-holding part defined in an upper portion thereof, wherein the pump-holding part is recessed downward and open upward, wherein the pump-holding part is pressed into an open upper portion of the inner case such that an outer perimeter of the pump-holding part contacts an inner perimeter of the inner case, and wherein the pump unit is coupled at an inner side of the pump-holding part.

2. The cosmetic-dispensing spatula of claim 1, wherein the spatula unit further comprises a pressing part protruding outward from the spreader surface.

3. The cosmetic-dispensing spatula of claim 2, wherein the dispensing hole is defined in one side of the spreader surface with respect to a second direction lateral to the first direction, and the pressing part has a slope such that one side of the pressing part is defined higher than an opposite side of the pressing part along the second direction.

4. The cosmetic-dispensing spatula of claim 1, wherein the spatula unit further comprises a pressing part protruding outward from a second surface opposite to the spreader surface.

5. The cosmetic-dispensing spatula of claim 1, wherein the spatula unit comprises:

a spatula blade having the spreader surface defined thereon and the dispensing hole defined in the spatula blade, the spatula blade having a coupling slot defined therein; and a spatula core having the discharge channel defined therein and configured to be inserted into the coupling slot.

6. The cosmetic-dispensing spatula of claim 1, wherein a plurality of dispensing holes are defined in the spatula unit in a particular interval along the first direction.

7. The cosmetic-dispensing spatula of claim 6, wherein a plurality of dispensing channels are defined in the spatula unit, the plurality of dispensing channels connecting the plurality of dispensing holes to the discharge channel, and at least one of the plurality of dispensing channels has a different diameter from another of the plurality of dispensing channels.

8. The cosmetic-dispensing spatula of claim 1, wherein the spatula unit comprises at least one material selected from a group consisting of stainless steel, silicone, plastic, and glass.

* * * * *